United States Patent
Glance (10) Patent No.: US 7,123,837 B2
(45) Date of Patent: *Oct. 17, 2006

(54) OPTICAL RING NETWORK ARCHITECTURE

(75) Inventor: Bernard Glance, Colts Neck, NJ (US)

(73) Assignee: AT & T Corp., Bedminster, NJ (US)

( * ) Notice: Subject to any disclaimer, the term of this patent is extended or adjusted under 35 U.S.C. 154(b) by 177 days.

This patent is subject to a terminal disclaimer.

(21) Appl. No.: 10/324,344

(22) Filed: Dec. 20, 2002

(65) Prior Publication Data

US 2003/0090759 A1    May 15, 2003

Related U.S. Application Data

(63) Continuation of application No. 09/175,171, filed on Oct. 20, 1998, now Pat. No. 6,567,197.

(51) Int. Cl.
*H04J 14/02* (2006.01)
(52) U.S. Cl. .............................. 398/83; 398/82; 398/85
(58) Field of Classification Search .................. 398/59, 398/79, 82, 83, 85, 87
See application file for complete search history.

(56) References Cited

U.S. PATENT DOCUMENTS

| | | | |
|---|---|---|---|
| 5,002,350 A | | 3/1991 | Dragone |
| 5,367,586 A | * | 11/1994 | Glance et al. ................. 385/24 |
| 5,576,875 A | * | 11/1996 | Chawki et al. ............... 398/72 |
| 5,680,235 A | * | 10/1997 | Johansson ...................... 398/7 |
| 5,717,795 A | | 2/1998 | Sharma et al. |
| 5,760,934 A | | 6/1998 | Sutter et al. |
| 5,903,371 A | | 5/1999 | Arecco et al. |
| 5,930,016 A | | 7/1999 | Brorson et al. |
| 6,046,833 A | | 4/2000 | Sharma et al. |
| 6,061,157 A | | 5/2000 | Terahara |
| 6,208,443 B1 | | 3/2001 | Liu et al. |
| 6,285,479 B1 | * | 9/2001 | Okazaki et al. ............... 398/56 |
| 6,567,197 B1 | * | 5/2003 | Glance ........................ 398/82 |

OTHER PUBLICATIONS

Hamada, et al, "WDM four-fiber ring with add/drop acousto-optic tunable filter and 4×4 optical switch", 1997, OFC '97 Technic Digest, pp. 313-314 (U.S.)*.
N.J. Frigo, "Passive Optical Networks," Optics & Photonics News (Feb. 1996).

* cited by examiner

*Primary Examiner*—Dalzid Singh (57) ABSTRACT

An optical ring network architecture including a number (N) of multi-add/drop filters, such as filters formed using symmetrical pairs of frequency routers. Each multi-add/drop filter is coupled to two other multi-add/drop filters using N−2 transmission media, such as optical fibers, to form a ring. The network also includes a number (N) of terminal stations associated with the multi-add/drop filters. A terminal station (p) is coupled with, and receives information from, its associated multi-add/drop filter (p) through a single optical fiber. In addition, the terminal station p is coupled with, and transmits information in a first direction around the ring to, a multi-add/drop filter p+1 through a single optical fiber. Communications from terminal station p to each other terminal station in the first direction are assigned one of N−1 wavelengths such that no two wavelengths on a given optical fiber are associated with communications between terminal stations in the same direction. Moreover, all wavelengths on a given optical fiber may be associated with a communication between terminal stations in either the first or second direction. As a result, each terminal station can communicate with each other terminal station simultaneously using wavelength division multiplexing and N−1 wavelengths. The network may also be bi-directional such that each terminal station p is coupled with, and transmits information in a second direction opposite the first direction to, a multi-add/drop filter p−1 through a single optical fiber.

2 Claims, 8 Drawing Sheets

OPTICAL RING NETWORK ARCHITECTURE

CROSS REFERENCE TO RELATED APPLICATIONS

The present application is a continuation of U.S. application Ser. No. 09/175,171, filed on Oct. 20, 1998, now U.S. Pat. No. 6,567,197.

FIELD OF THE INVENTION

The present invention relates to optical networks. More particularly, the present invention relates to an optical ring network architecture.

BACKGROUND OF THE INVENTION

The use of optical networks can dramatically increase the amount of information, such as telephone, video and Internet information, that can be communicated between network users as compared to traditional networks. Such an optical network can, for example, connect a number of terminal stations through a number of parallel optical fibers. When a user at a first terminal station wants to transmit information to a user at a second terminal station, the information is transmitted through one of the optical fibers with a dedicated wavelength of light.

The user at the first terminal station may also want to simultaneously transmit information to a number of different users located at a number of different terminal stations. Moreover, users at a number of different terminal stations may want to transmit information to each other simultaneously. Creating a network that lets all users communicate with all other users simultaneously, however, tends to increase the number of optical fibers that must be used in the network. Unfortunately, each additional optical fiber that is used can be very expensive to install and maintain. In addition, some networks need to be fully "restorable," meaning that each user can still communicate with each other user when any one of the optical fibers fail. This also tends to increase the number of optical fibers required in the network.

One way to reduce the number of optical fibers in a network is to use Wavelength Division Multiplexing (WDM). In a WDM network, a set of wavelengths, such as $\lambda_1, \lambda_2, \ldots \lambda_n$, are used so that several communications can be simultaneously transmitted over a single optical fiber using different wavelengths. To increase the amount of information that can be transmitted over the network, and to reduce the cost of optical transmitters, receivers and routers, it is desirable to keep the number of different wavelengths used in the network as small as possible.

In addition, to avoid interference in the network a single wavelength should not be used to simultaneously transmit different information over the same optical fiber in the same direction.

Moreover, it may be necessary to amplify one or more signals being transmitted over an optical fiber in the network. In this case, it is desirable that information is not simultaneously transmitted over the same optical fiber using the same wavelength, even if the transmissions are in opposite directions.

In view of the foregoing, it can be appreciated that a substantial need exists for an optical network architecture that reduces the number of optical fibers and wavelengths used in the network and solves the other problems discussed above.

SUMMARY OF THE INVENTION

The disadvantages of the art are alleviated to a great extent by an optical ring network architecture including a number (N) of multi-add/drop filters, such as filters formed using symmetrical pairs of frequency routers. Each multi-add/drop filter is coupled to two other multi-add/drop filters using N−2 transmission media, such as optical fibers, to form a ring. The network also includes a number (N) of terminal stations associated with the multi-add/drop filters. A terminal station (p) is coupled with, and receives information from, its associated multi-add/drop filter (p) through a single optical fiber. In addition, the terminal station p is coupled with, and transmits information in a first direction around the ring to, a multi-add/drop filter p+1 through a single optical fiber.

Communications from terminal station p to each other terminal station in the first direction are assigned one of N−1 wavelengths such that no two wavelengths on a given optical fiber are associated with communications between terminal stations in the same direction. When there are four terminal stations, for example, the second terminal station may communicate with the first, third and fourth terminal stations using wavelengths $\lambda_1$, $\lambda_3$ and $\lambda_2$ respectively. Moreover, all wavelengths on a given optical fiber may be associated with a communication between terminal stations in either the first or second direction. As a result, each terminal station can communicate with each other terminal station simultaneously using wavelength division multiplexing and N−1 wavelengths. The network may also be bi-directional such that each terminal station p is coupled with, and transmits information in a second direction opposite the first direction to, a multi-add/drop filter p−1 through a single optical fiber.

With these and other advantages and features of the invention that will become hereinafter apparent, the nature of the invention may be more clearly understood by reference to the following detailed description of the invention, the appended claims and to the several drawings attached herein.

DETAILED DESCRIPTION

Figure 1:
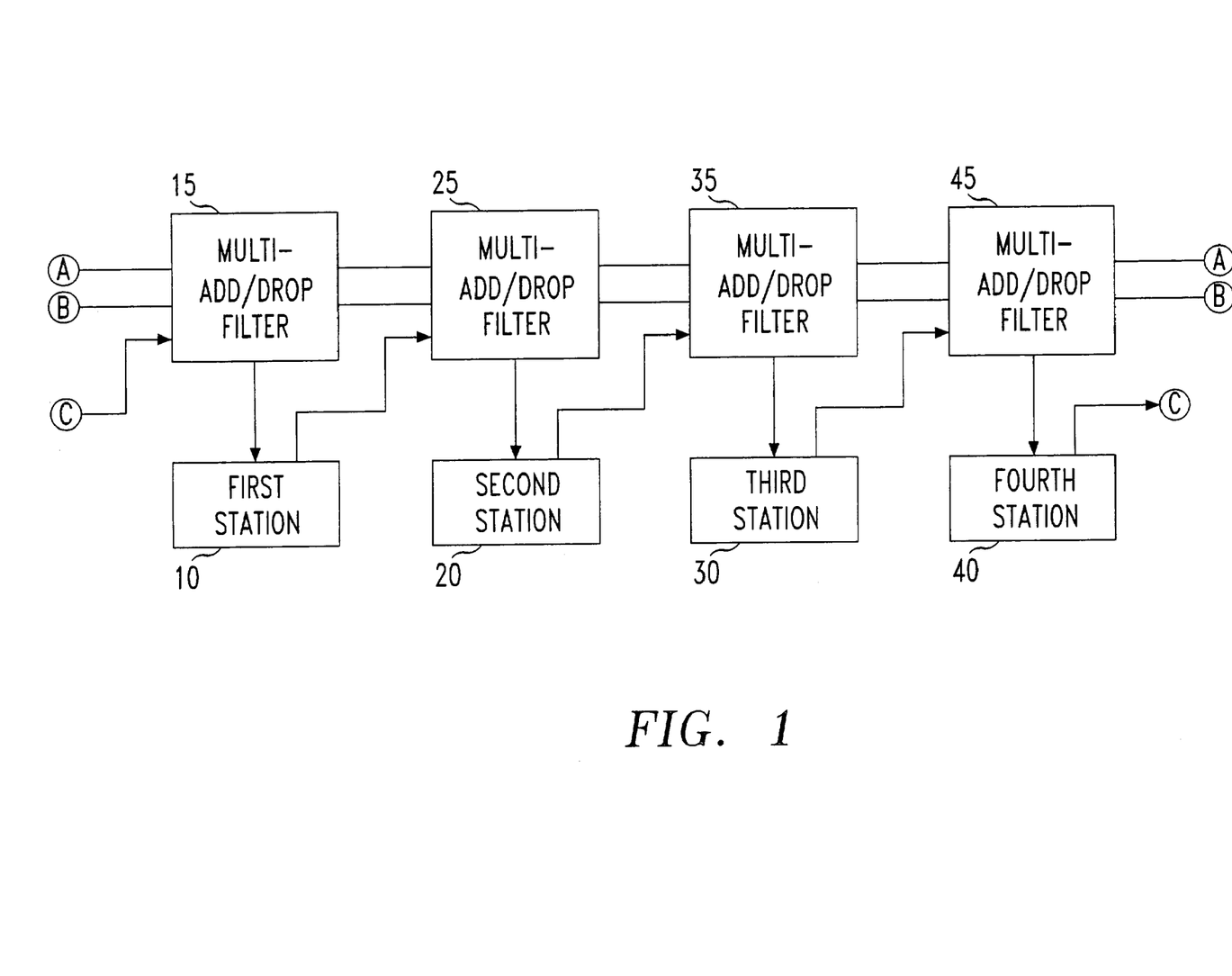
FIG. 1 is a block diagram of an optical ring network architecture connecting four terminal stations according to an embodiment of the present invention.

The present invention is directed to an optical ring network architecture. Referring now in detail to the drawings wherein like parts are designated by like reference numerals throughout, there is illustrated in FIG. 1 a block diagram of an optical ring network architecture connecting four terminal stations 10, 20, 30, 40 according to an embodiment of the present invention. The network includes a number (N) of multi-add/drop filters 15, 25, 35, 45, and each multi-add/drop filter is coupled to two other multi-add/drop filters to form a ring. The operation of the multi-add/drop filters is described in detail with respect to FIGS. 3 to 8.

The network also includes a number (N) of terminal stations, and each terminal station is associated with a different multi-add/drop filter. Although the network shown in FIG. 1 illustrates a network connecting four multi-add/drop filters and four terminal stations, other numbers of multi-add/drop filters and terminal stations may be used instead.

According to an embodiment of the present invention, each terminal station is capable of communicating with each other terminal station simultaneously using wavelength division multiplexing and N−1 wavelengths, such as $\lambda_1$, $\lambda_2$ and $\lambda_3$, as follows. The multi-add/drop filters are coupled to each other using N−2 transmission media, such as optical fibers in an optical fiber trunk. Each terminal station (p) is coupled with, and receives information from, its associated multi-add/drop filter (p) through a single transmission medium. For example, the second station 20 receives information from the network through a single transmission medium connected to multi-add/drop filter 25. Note that in the network shown in FIG. 1, terminal station "p" may be any of the four terminal stations 10, 20, 30, 40 illustrated.

In addition, each terminal station p is coupled with, and transmits information in a first direction around the ring to, a multi-add/drop filter p+1 through a single transmission medium, wherein multi-add/drop filter p+1 is the multi-add/drop filter neighboring multi-add/drop filter p in the first direction. For example, the second station 20 sends information to the network through a single transmission medium connected to the multi-add/drop filter 35 associated with the third station 30. Because the network is arranged in a ring, the fourth station 40 sends information to the network through a single transmission medium connected to the multi-add/drop filter 15 associated with the first station 10.

Communications from the terminal station p to each other terminal station in the first direction are assigned a different one of the N−1 wavelengths. For example, the second station 20 may send information to the third station 30, in the direction from left to right in FIG. 1, using $\lambda_1$ (not labeled in FIG. 1). Similarly, the second station 20 may send information in the first direction to the fourth station 40 using $\lambda_3$ and to the first station 10 using $\lambda_2$. A detailed illustration of a network in which communications from a terminal station to each other terminal station in the first direction are assigned a different one of the N−1 wavelengths is discussed with respect to FIGS. 4 to 7.

Figure 2:
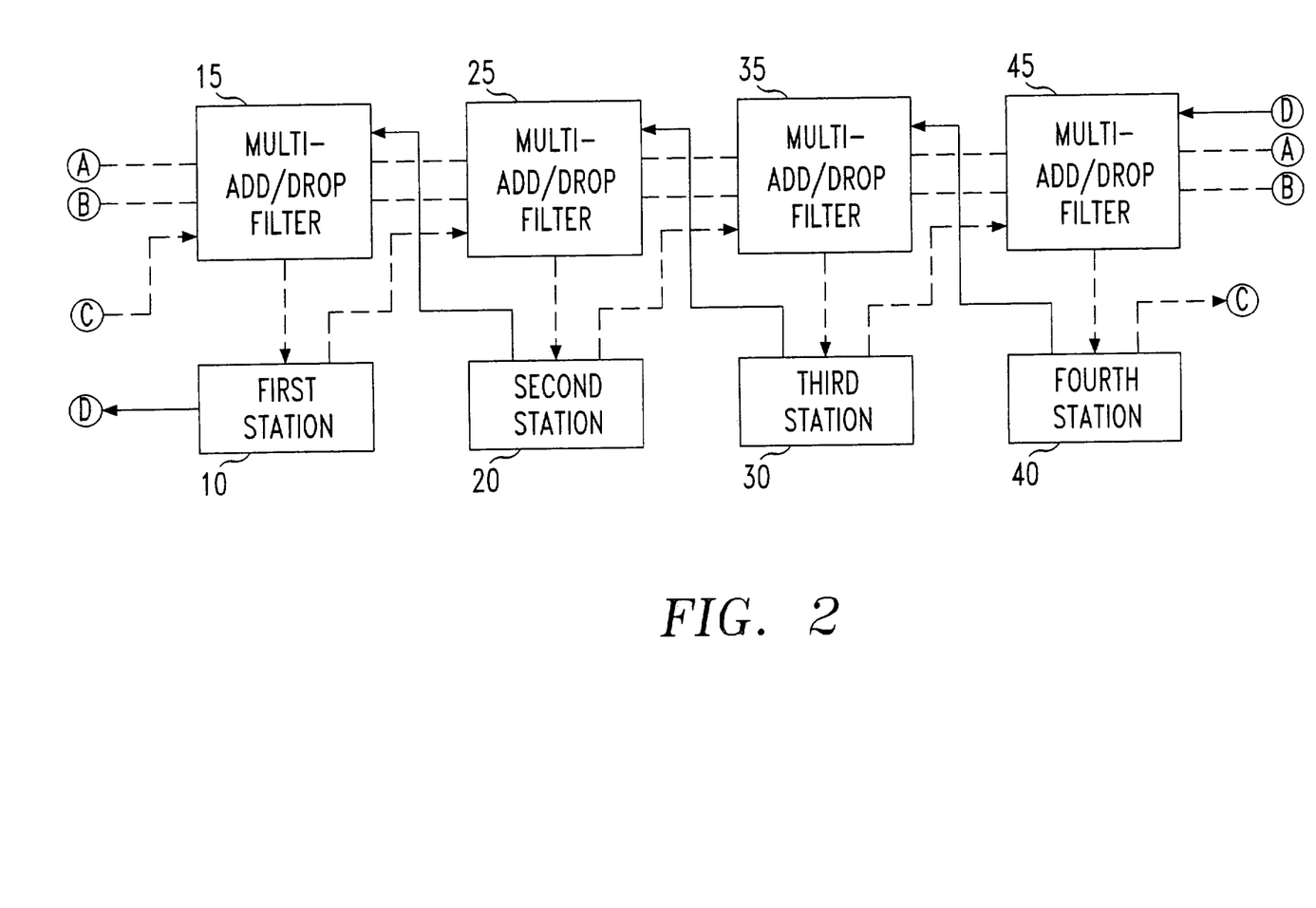
FIG. 2 is a bi-directional optical ring network architecture according to another embodiment of the present invention.

FIG. 2 is a bi-directional optical ring network architecture according to another embodiment of the present invention. An additional transmission medium, shown as a solid arrow in FIG. 2, is used to couple each terminal station p with a multi-add/drop filter p−1, wherein multi-add/drop filter p−1 is the multi-add/drop filter neighboring multi-add/drop filter p in a second direction opposite the first direction. The additional transmission medium is used to transmit information in this second direction, or from right to left in FIG. 2. In addition, wavelengths may be selected, as explained with respect to FIG. 8, such that no two of the N−1 wavelengths, such as $\lambda_1$, $\lambda_2$ and $\lambda_3$, on a given transmission medium are associated with communications between terminal stations in the same direction. Moreover, all of the N−1 wavelengths on a given transmission medium may be associated with communications between terminal stations in either the first or second directions.

In this way, the optical ring network may be fully restorable in the event that a single transmission medium fails. That is, if an optical fiber breaks such that a terminal station can no longer transmit to one or more remaining terminal stations in the first direction, the terminal station can still communicate with those remaining terminal stations in the second direction. Moreover, the capability of the network can be doubled when there is no failure by sending information in both directions around the ring.

Figure 3:
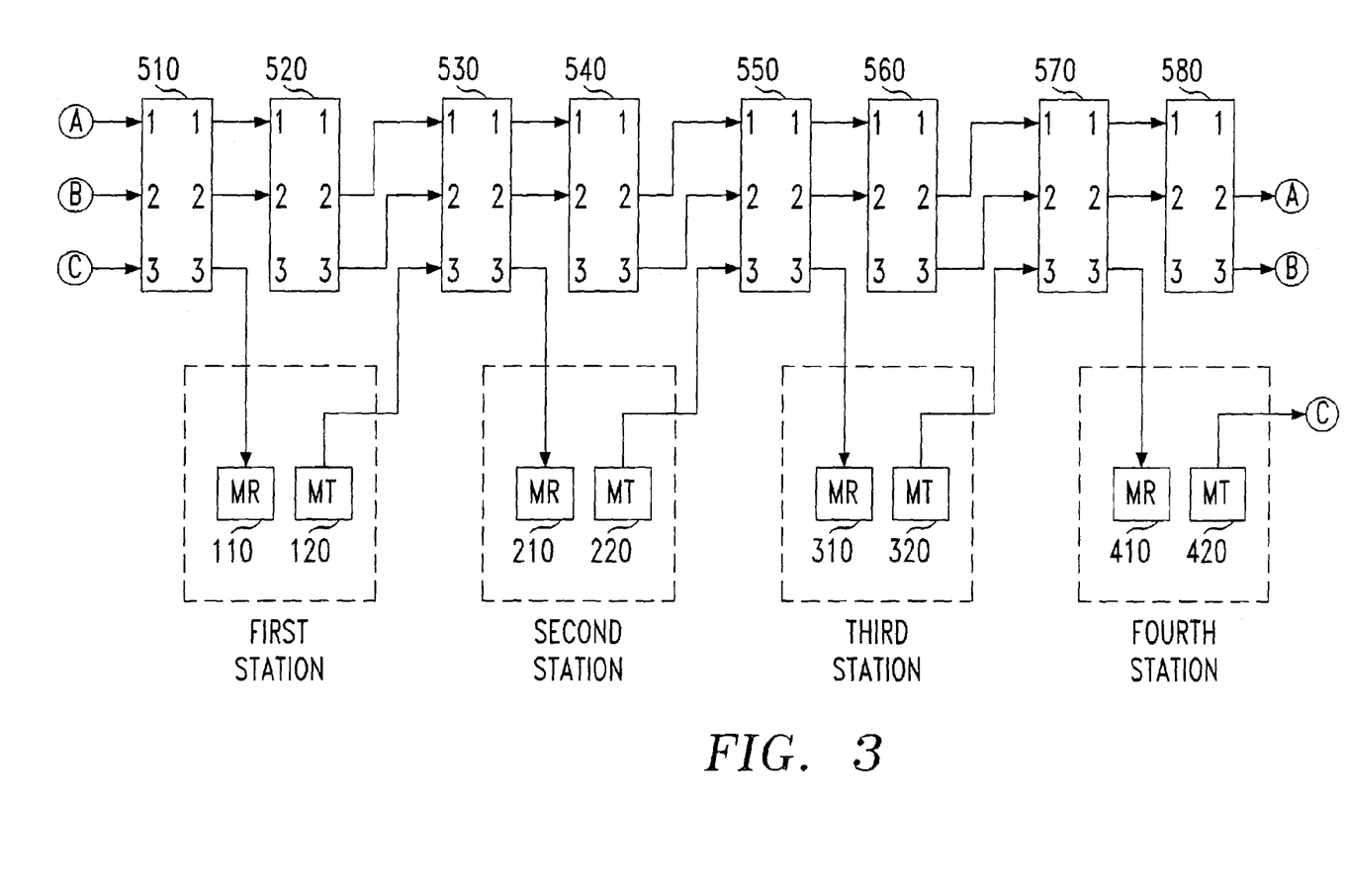
FIG. 3 shows the optical ring network architecture of FIG. 1 in greater detail according to an embodiment of the present invention.

FIG. 3 shows the optical ring network architecture of FIG. 1 in greater detail according to an embodiment of the present invention. Each terminal station includes a Multiple Transmitter (MT) configured to transmit information to the network and a Multiple Receiver (MR) configured to receive information from the network. For example, the second station includes a multiple receiver 210 and a multiple transmitter 220. As used herein, a "multiple" transmitter or receiver may be, for example, a device with an array of transmitters or receivers. This lets the device transmit or receive information using multiple wavelengths simultaneously.

Each of the multi-add/drop filters comprises a symmetrical pair of frequency routers. For example, the multi-add/drop filter associated with the second station comprises an "input" frequency router 530 and an "output" frequency router 540. Each of the frequency routers has 3 input ports, located on the left in FIG. 3, and 3 output ports, located on the right in FIG. 3. Note that only two of the three output ports are used. Although routers and ports are referred to herein as being either "input" or "output" devices, it should be noted that signals may also pass through the routers and ports in the opposite direction.

A detailed explanation of frequency router and multi-add/drop filter technology is provided in U.S. Pat. No. 5,002,350 to Dragone and U.S. Pat. No. 5,367,586 to Glance et al., the entire disclosures of which is hereby incorporated by reference. The operation of the input and output frequency routers shown in FIG. 3 will now be briefly described.

As shown in FIG. 3, each input frequency router 510, 530, 550, 570 has three input ports and three output ports. When an optical beam comprised of wavelengths $\lambda$hd 1 to $\lambda_3$ enters one of the input frequency routers 510, 530, 550, 570 at input port 1, $\lambda_1$ exits at output port 1, $\lambda_2$ exits at output port 3, and $\lambda_3$ exits at output port 2. In general, as shown in Table I, when $\lambda_1$ enters input port X, $\lambda_1$ exits from output port X. When $\lambda_2$ enters input port X, $\lambda_2$ exits from output port X+2, and when $\lambda_3$ enters input port X, $\lambda_3$ exits from output port X+1. Moreover, the input frequency routers 510, 530, 550, 570 have a "cyclical routing quality" in that when the solution of this general equation results in an output port greater than 3, the wavelength "wraps" around to the top of the frequency router. For example, when $\lambda_2$ enters input port 3, $\lambda_2$ exits from output port 2.

TABLE I

Input Frequency Router Connection Table

|  | Output Port 1 | Output Port 2 | Output Port 3 |
|---|---|---|---|
| Input Port 1 | $\lambda_1$ | $\lambda_3$ | $\lambda_2$ |
| Input Port 2 | $\lambda_2$ | $\lambda_1$ | $\lambda_3$ |
| Input Port 3 | $\lambda_3$ | $\lambda_2$ | $\lambda_1$ |

When an optical beam comprised of wavelengths $\lambda_1$ to $\lambda_3$ enters one of the output frequency routers 520, 540, 560, 580 at input port 1, $\lambda_1$ exits at output port 1, $\lambda_2$ exits at output port 2, and $\lambda_3$ exits at output port 3. In general, as shown in Table II, when $\lambda_x$ enters input port X, $\lambda_x$ exits from output port (X+x−1). As with the input frequency routers 510, 530, 550, 570, the output frequency routers 520, 540, 560, 580 also have a cyclical routing quality.

TABLE II

Output Frequency Router Connection Table

|  | Output Port 1 | Output Port 2 | Output Port 3 |
|---|---|---|---|
| Input Port 1 | $\lambda_1$ | $\lambda_2$ | $\lambda_3$ |
| Input Port 2 | $\lambda_3$ | $\lambda_1$ | $\lambda_2$ |
| Input Port 3 | $\lambda_2$ | $\lambda_3$ | $\lambda_1$ |

Finally, both the input and output frequency routers have the property of "reciprocity," meaning that when a signal enters an output port, i.e. travels right to left in FIG. 3, it exits from the same input port associated with travel in the other direction. For example, Table II demonstrates that when $\lambda_3$ enters input port 2 it exits from output port 1. Thus, if $\lambda_3$ enters output port 1, reciprocity requires that it exit from input port 2. Note that input and output frequency routers having three input and output ports are used to illustrate an embodiment of the present invention, input and output frequency routers having a different number of input and output ports may be used instead, such as when more than four terminal stations are present in an optical ring network.

Referring again to FIG. 3, the multi-add/drop filter associated with the second station, comprised of input frequency router 530 and output frequency router 540, will now be described in detail. Output ports 1 and 2 of the input frequency router 530 are coupled to input ports 1 and 2 of the output frequency router 540, respectively, and output port 3 of the input frequency router 530 is coupled to the second station's multiple receiver 210. Output ports 2 and 3 of the output frequency router 540 are respectively coupled to input ports 1 and 2 of the neighboring input frequency router 550, associated with the third station. Finally, the second station's multiple transmitter 220 is coupled to input port 3 of the neighboring input frequency router 550. The other multi-add/drop filters are similarly constructed.

Note that input port 3 and output port 1 of the output frequency router 540 are not used. These ports are used with respect to communications through the network in the opposite direction, as explained with respect to FIG. 8.

Thus, where N represents the total number of terminal stations, or 4 in the architecture shown in FIG. 3, N−2 output ports of an output frequency router associated with a multi-add/drop filter p are coupled to N−2 input ports of an input frequency router associated with a multi-add/drop filter p+1.

Figure 4:
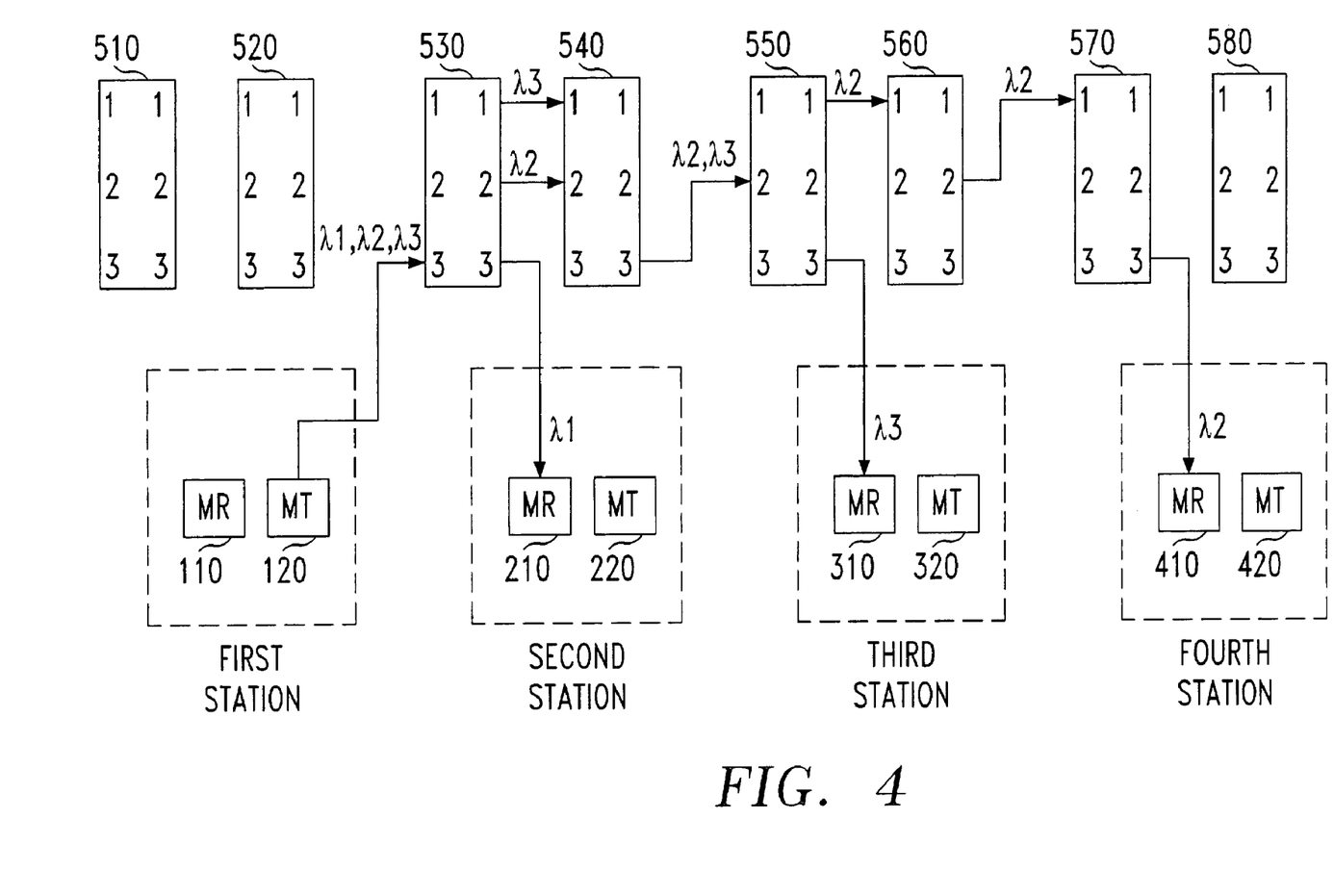
FIG. 4 illustrates transmissions from the first terminal station of the optical ring network shown in FIG. 3 according to an embodiment of the present invention.

FIG. 4 illustrates transmissions from the first terminal station of the optical ring network shown in FIG. 3 according to an embodiment of the present invention. The multiple transmitter 120 associated with the first station transmits $\lambda_1$, $\lambda_2$ and $\lambda_3$ into the network through an optical fiber coupled to input port 3 of the input frequency router 530 associated with the second station. As can be seen from Table I, when $\lambda_1$ enters an input frequency router's input port 3, $\lambda_1$ exits from the input frequency router's output port 3, in this case sending information to the second station's multiple receiver 210. This is how the first station transmits information to the second station.

When $\lambda_2$ enters an input frequency router's input port 3, $\lambda_2$ exits from the input frequency router's output port 2. As shown in FIG. 4, $\lambda_2$ then travels to input port 2 of the associated output frequency router 540. As can be seen in Table II, when $\lambda_2$ enters an output frequency router's input port 2, $\lambda_2$ exits from the output frequency router's output port 3.

Similarly, when $\lambda_3$ enters input port 3 of input frequency router 530, $\lambda_3$ exits from the input frequency router's output port 1. As shown in FIG. 4, $\lambda_3$ then travels to input port 1 of the associated output frequency router 540. As can be seen in Table II, when $\lambda_3$ enters an output frequency router's input port 1, $\lambda_3$ exits from the output frequency router's output port 3.

Thus, when the first station transmits $\lambda_1$, $\lambda_2$ and $\lambda_3$ into the multi-add/drop filter associated with the second station, $\lambda_1$ "drops" down to the second station's multiple receiver 210, and the remaining wavelengths, namely $\lambda_2$ and $\lambda_3$, pass on to the next multi-add/drop filter.

When $\lambda_2$ and $\lambda_3$ enter input port 2 of input frequency router 550, $\lambda_3$ drops down to the third station's multiple receiver 310. This is how the first station transmits to the third station. $\lambda_2$ passes on to the next multi-add/drop filter and is dropped down to the fourth station's multiple receiver 410. This is how the first station transmits to the fourth station. Thus, by using N−1 wavelengths, or $\lambda_1$, $\lambda_2$ and $\lambda_3$, the first station is able to simultaneously transmit information to each other station.

Figure 5:
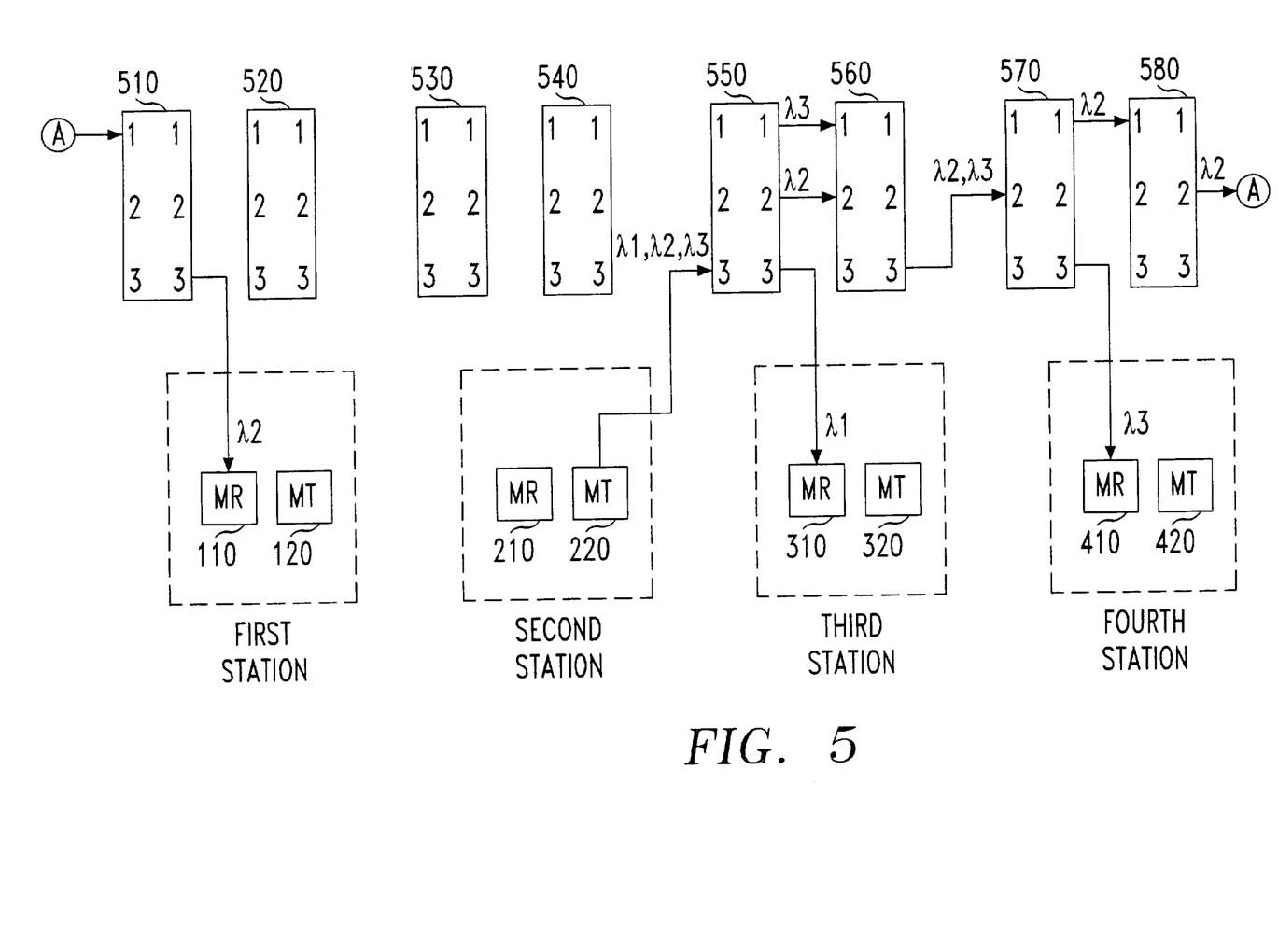
FIG. 5 illustrates transmissions from the second terminal station of the optical ring network shown in FIG. 3 according to an embodiment of the present invention.

FIG. 5 illustrates transmissions from the second terminal station of the optical ring network. The second station's multiple transmitter 220 sends $\lambda_1$, $\lambda_2$ and $\lambda_3$ into the multi-add/drop filter associated with the third station. The input frequency router 550 drops $\lambda_1$ down to the third station's multiple receiver 310, and $\lambda_2$ and $\lambda_3$ pass on to the multi-add/drop filter associated with the fourth station. The input frequency router 570 drops $\lambda_3$ down to the fourth station's multiple receiver 410, and $\lambda_2$ passes on to the multi-add/drop filter associated with the first station, where the input frequency router 510 drops $\lambda_2$ down to the first station's multiple receiver 110. In this way, the second station transmits to the third, fourth and first stations using $\lambda_1$, $\lambda_3$ and $\lambda_2$, respectively.

Figure 6:
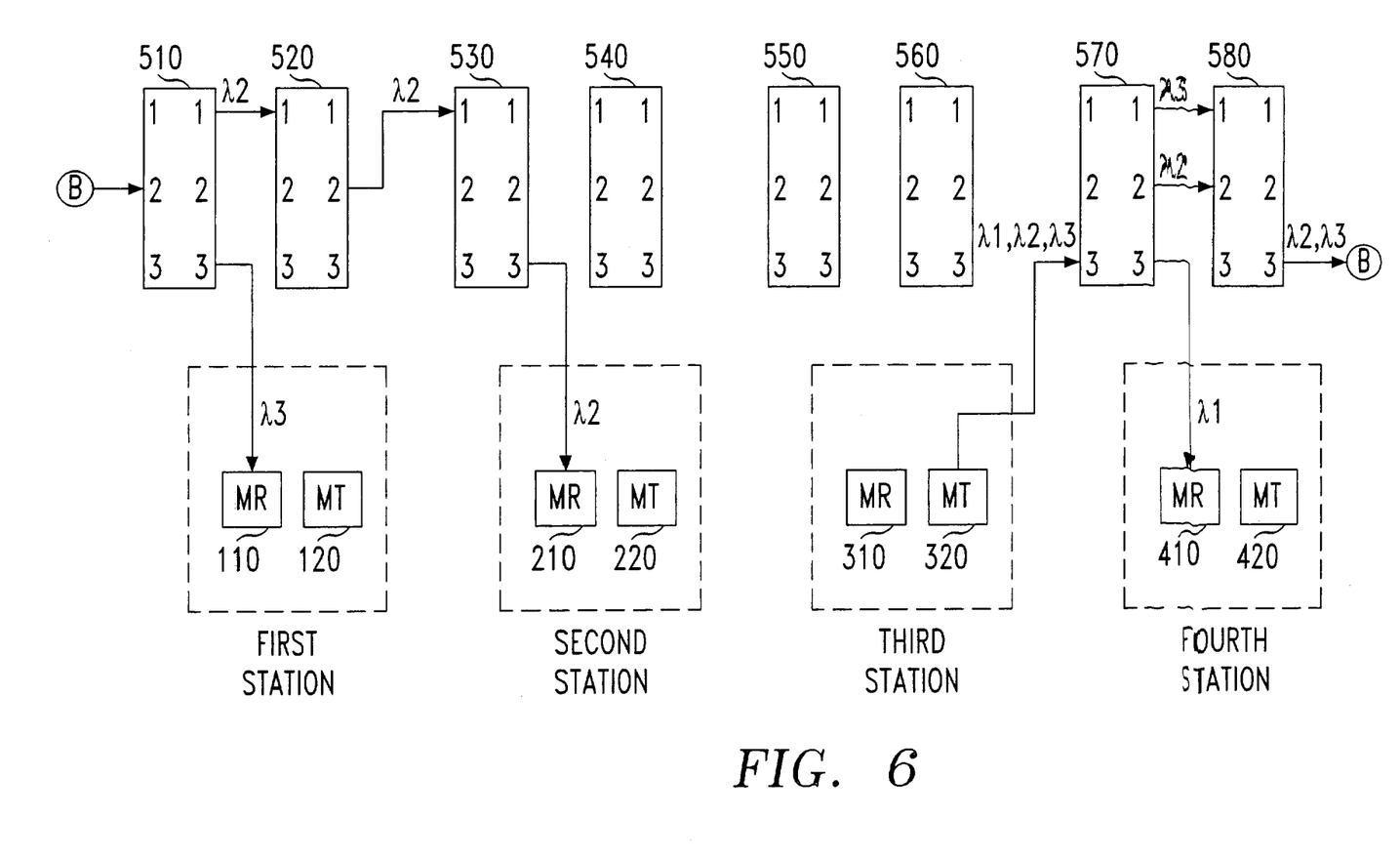
FIG. 6 illustrates transmissions from the third terminal station of the optical ring network shown in FIG. 3 according to an embodiment of the present invention.

FIG. 6 illustrates transmissions from the third terminal station of the optical ring network. The third station's multiple transmitter 320 sends $\lambda_1$, $\lambda_2$ and $\lambda_3$ into the multi-add/drop filter associated with the fourth station. The input frequency router 570 drops $\lambda_1$ down to the fourth station's multiple receiver 410, and $\lambda_2$ and $\lambda_3$ pass on to the multi-add/drop filter associated with the first station. The input frequency router 710 drops $\lambda_3$ down to the first station's multiple receiver 110, and $\lambda_2$ passes on to the multi-add/drop filter associated with the second station, where the input frequency router 530 drops $\lambda_2$ down to the second station's multiple receiver 210.

In this way, the third station transmits to the fourth, first and second stations using $\lambda_1$, $\lambda_3$ and $\lambda_2$, respectively.

Figure 7:
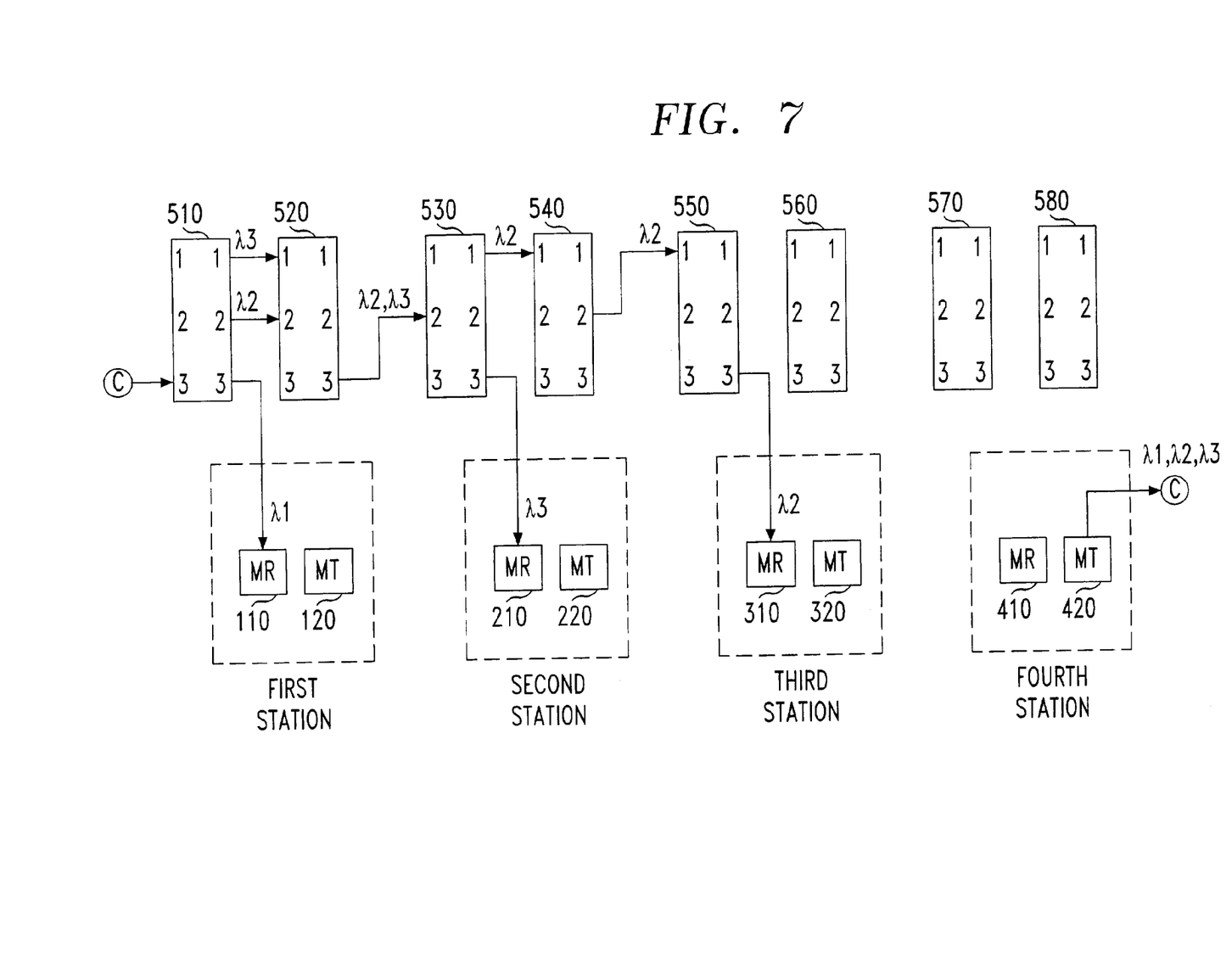
FIG. 7 illustrates transmissions from the fourth terminal station of the optical ring network shown in FIG. 3 according to an embodiment of the present invention.

FIG. 7 illustrates transmissions from the fourth terminal station of the optical ring network. The fourth station's multiple transmitter 420 sends $\lambda_1$, $\lambda_2$ and $\lambda_3$ into the multi-add/drop filter associated with the first station. The input frequency router 510 drops $\lambda_1$ down to the first station's multiple receiver 110, and $\lambda_2$ and $\lambda_3$ pass on to the multi-add/drop filter associated with the second station. The input frequency router 530 drops $\lambda_3$ down to the second station's multiple receiver 310, and $\lambda_2$ passes on to the multi-add/drop filter associated with the third station, where the input frequency router 550 drops $\lambda_2$ down to the third station's multiple receiver 310. In this way, the fourth station transmits to the first, second and third stations using $\lambda_1$, $\lambda_3$ and $\lambda_2$, respectively.

In addition to being able to simultaneously transmit to each other station using different wavelengths, each terminal station is able to simultaneously receive information from each other terminal station using different wavelengths. For example, as explained with respect to FIG. 4, the second station receives information from the first station using $\lambda_1$. As explained with respect to FIG. 6, the second station receives information from the third station using $\lambda_2$. Finally, as explained with respect to FIG. 7, the second station receives information from the third station using $\lambda_3$.

Figure 8:
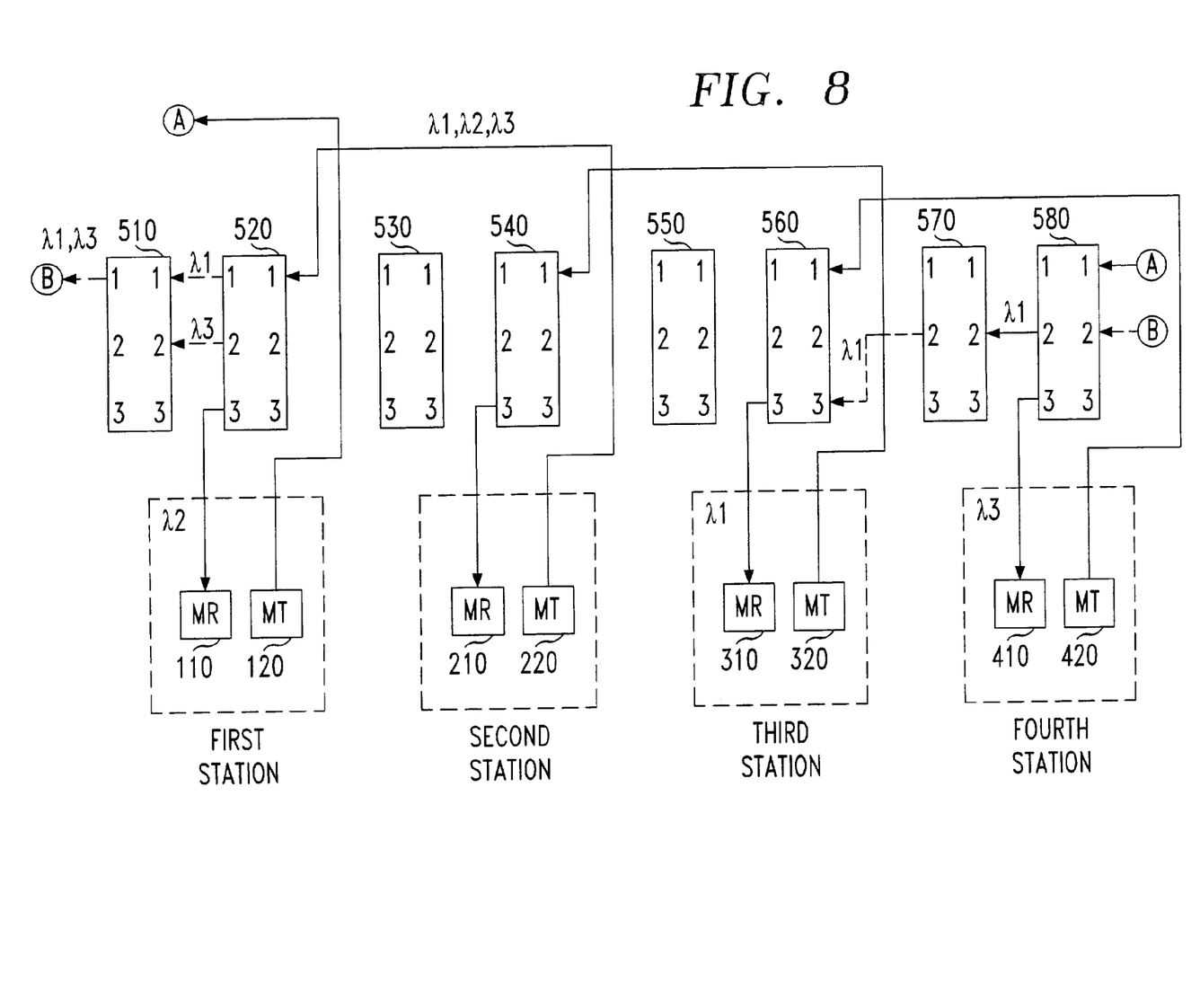
FIG. 8 shows how the architecture of FIG. 3 may be used in a bi-directional optical ring network according to another embodiment of the present invention.

FIG. 8 shows how the architecture of FIG. 3 may be used in a bi-directional optical ring network according to another embodiment of the present invention. The solid arrows represent transmission media that have been added to the connections shown in FIG. 3. An additional transmission medium is used to couple each terminal station p with a multi-add/drop filter p−1, wherein the multi-add/drop filter p−1 is the multi-add/drop filter neighboring multi-add/drop filter p in the "second" direction, or from right to left in FIG. 8. The additional transmission medium is used to transmit information in this second direction.

Wavelengths may be selected such that no two of the N−1 wavelengths, such as $\lambda_1$, $\lambda_2$ and $\lambda_3$, on a given transmission medium are associated with communications between terminal stations in the same direction. Moreover, all of the N−1 wavelengths, such as $\lambda_1$, $\lambda_2$ and $\lambda_3$, on a given transmission medium may be associated with a communication between terminal stations in either the first or second directions.

By way of example, the transmission of information from the second station in the second direction will now be described. The dashed arrows shown in FIG. 8 are the same connections as were described with respect to FIG. 3, but are duplicated here for ease of explanation. The second station's multiple transmitter 220 transmits $\lambda_1$, $\lambda_2$ and $\lambda_3$ into output port 1 of the output frequency router 520 associated with the first station. The same multiple transmitter that transmits information in the first direction may be used, or a second multiple transmitter may be used instead, if desired.

The output frequency router 520 associated with the first station drops $\lambda_2$ down to the first station's multiple receiver 110. The same multiple receiver that receives information from the first direction may be used, or a second multiple receiver may be used instead, if desired. In either case, $\lambda_1$ and $\lambda_3$ pass on to the multi-add/drop filter associated with the fourth station, where $\lambda_3$ drops down to the fourth station's multiple receiver 410, and $\lambda_1$ continues on to the third station's multiple receiver 310.

In this way, if an optical fiber breaks such that a terminal station can no longer transmit to one or more remaining terminal stations in the first direction, that terminal station can still communicate with the remaining terminal stations in the second direction. Moreover, the capability of the network can be doubled when there is no failure by sending information in both directions around the ring.

Finally, note that in the bi-directional network every one of the wavelength $\lambda_1$, $\lambda_2$ and $\lambda_3$ on any given optical fiber is associated with a communication between terminal stations in either the first or second direction. Consider, for example, the fiber coupling output port 1 of input frequency router 510 with input port 1 of output frequency router 520. As shown in FIGS. 6 and 7, this fiber carries $\lambda_2$ and $\lambda_3$ in the first direction. As shown in FIG. 8, this fiber also carries $\lambda_1$ in the second direction.

Although various embodiments are specifically illustrated and described herein, it will be appreciated that modifications and variations of the present invention are covered by the above teachings and within the purview of the appended claims without departing from the spirit and intended scope of the invention. For example, although particular architectures were used to illustrate the present invention, it can be appreciated that other architectures may be used instead, including other numbers of terminals, input ports and output ports and/or the selection of different ports to couple devices. Similarly, although particular devices were used within the illustrated embodiments, other devices will also fall within the scope of the invention.

What is claimed is:

1. An optical ring network, comprising:
    a number (p) of multi-add/drop filters, each multi-add/drop filter being coupled to two other multi-add/drop filters to form a ring;
    a number (p) of terminal stations, each terminal station being associated with a different one of the multi-add/drop filters;
    wherein each terminal station is capable of communicating with each other terminal station simultaneously using wavelength division multiplexing and N−1 wavelengths, where N is an integer greater than 2;
    wherein each of the multi-add/drop filters comprises a symmetrical pair of frequency routers;
    an input frequency router having input and output ports; and
    an output frequency router having input and output ports;
    wherein N−2 output ports of the output frequency router associated with multi-add/drop filter p are coupled to N−2 input ports of the input router associated with multi-add/drop filter p+1, wherein multi-add/drop filter p+1 is the multi-add/drop filter neighboring multi-add/drop filter p in a first direction.

2. A method of communicating over an optical ring network having a number N of terminal stations and associated multi-add/drop filters, each of the multi-add/drop filters being coupled to two other multi-add/drop filters to form a ring, comprising the steps of:
    transmitting information from each terminal station to each other terminal station simultaneously using wavelength division multiplexing and N−1 wavelengths, where N is an integer greater than 2; and
    receiving information at each terminal station from each other terminal station simultaneously, in a first direction around the ring, using wavelength division multiplexing and the N−1 wavelengths;
    wherein the steps of transmitting and receiving are performed by transmitting and receiving information through multi-add/drop filters comprising an input frequency router having input and output ports and an output frequency router having input and output ports, wherein N−2 output ports of the output frequency router associated with multi-add/drop filter p are coupled to N−2 input ports of the input router associated with multi-add/drop filter p+1, wherein multi-add/drop filter p+1 is the multi-add/drop filter neighboring multi-add/drop filter p in a first direction.

* * * * *